(12) United States Patent
Hünecke et al.

(10) Patent No.: US 8,388,281 B2
(45) Date of Patent: Mar. 5, 2013

(54) METHOD FOR PRODUCING BEVEL GEARS HAVING HYPOCYCLOIDAI TEETH IN THE CONTINUOUS INDEXING METHOD USING A CORRESPONDING FACE CUTTER HEAD

(75) Inventors: Carsten Hünecke, Hessisch Oldendorf (DE); Hartmuth Müller, Remscheid (DE)

(73) Assignee: Klingelnberg AG, Zurich (CH)

( * ) Notice: Subject to any disclaimer, the term of this patent is extended or adjusted under 35 U.S.C. 154(b) by 35 days.

(21) Appl. No.: 13/097,848

(22) Filed: Apr. 29, 2011

(65) Prior Publication Data
US 2011/0262238 A1     Oct. 27, 2011

Related U.S. Application Data

(63) Continuation of application No. PCT/EP2009/063189, filed on Oct. 9, 2009.

(30) Foreign Application Priority Data

Oct. 30, 2008 (EP) .................................. 08167925
May 7, 2009 (EP) .................................. 09159654

(51) Int. Cl.
  *B23F 5/24* (2006.01)
(52) U.S. Cl. ................ 409/26; 409/28; 409/54; 407/22; 407/25
(58) Field of Classification Search .................... 409/26, 409/25, 27, 28, 39, 51, 53, 54; 407/22, 21, 407/25, 23; 451/148, 147, 51
See application file for complete search history.

(56) References Cited

U.S. PATENT DOCUMENTS

| 1,398,477 | A  | * | 11/1921 | Tibbetts ........................... 409/54 |
| 2,346,807 | A  |   | 4/1944  | Wildhaber |
| 3,571,876 | A  | * | 3/1971  | Blakesley ........................ 407/22 |
| 5,800,103 | A  | * | 9/1998  | Stadtfeld et al. ................. 409/27 |
| 6,311,590 | B1 | * | 11/2001 | Stadtfeld .......................... 407/22 |
| 6,336,777 | B1 | * | 1/2002  | Fisher et al. ..................... 409/26 |
| 6,609,858 | B1 | * | 8/2003  | Francis et al. ................... 407/21 |
| 7,059,810 | B2 | * | 6/2006  | Francis et al. ................... 407/23 |
| 2001/0028831 | A1 |   | 10/2001 | Iizuka et al. |

(Continued)

FOREIGN PATENT DOCUMENTS

| EP | 1 348 509 A2 | 10/2003 |
| EP | 2 314 405 A1 | 4/2011 |
| WO | WO 2007/090871 A1 | 8/2007 |
| WO | WO-2010/049256 A1 * | 5/2010 |
| WO | WO 2011/042315 A1 | 4/2011 |

OTHER PUBLICATIONS

International Search Report for International Application No. PCT/EP2009/063189, issued Feb. 9, 2010.

(Continued)

*Primary Examiner* — Erica E Cadugan
(74) *Attorney, Agent, or Firm* — McCarter & English, LLP

(57) ABSTRACT

A face milling cutter method for manufacturing various hypocycloidal bevel gears that is characterized in that the following steps are performed to manufacture a first bevel gear: equipping a universal face milling cutter in a first configuration with a first number of cutter groups that corresponds to a first number of passes. A first bevel gear is then produced in the continuous partial method using the universal face milling cutter in the first configuration. The following steps are performed to manufacture a second bevel gear: equipping the same universal face milling cutter in a second configuration with a second number of cutter groups that corresponds to a second number of passes. The second bevel gear is then produced in the continuous partial method using the universal face milling cutter in the second configuration.

12 Claims, 10 Drawing Sheets

U.S. PATENT DOCUMENTS

2007/0140798 A1* 6/2007 Cole et al. .............. 407/21
2010/0111629 A1* 5/2010 Durr ....................... 409/27
2012/0027531 A1* 2/2012 Kreh ...................... 409/26

OTHER PUBLICATIONS

International Preliminary Report on Patentability for International Application No. PCT/EP2009/063189, issued May 3, 2011.

"Kegelräder; Grundlagen, Anwendungen [Bevel Gears; Foundations, Applications]", Jan Klingelnberg, Springer Verlag, 2008, pp. 38-43.

"Stanki dja obrabotki konitscheskich zubtschatych kolos," Izdanie 2-e, V. N. Kedrinskij, K. M. Pismanik, Izdatelstvo "Maschinostroenie" Moskva 1967, pp. 505-508.

* cited by examiner $n_1 = 2$
$n_2 = 2$
$G_{1max} = 13$
$G_{2max} = 15$ n1 = 2
G₁max = 20

METHOD FOR PRODUCING BEVEL GEARS HAVING HYPOCYCLOIDAL TEETH IN THE CONTINUOUS INDEXING METHOD USING A CORRESPONDING FACE CUTTER HEAD

CROSS-REFERENCE TO RELATED APPLICATIONS

This application is a continuation of International Patent Application No. PCT/EP2009/063189, filed Oct. 9, 2009 designating the United States, and claims priority under 35 U.S.C. §119(a)-(d) to European Patent Application EP 08 167 925.0, filed on 30 Oct. 2008, and European Patent Application EP 09 159 654.4, filed on 7 May 2009, the contents of all of which are hereby incorporated by reference in their entirety as part of the present disclosure.

FIELD OF THE INVENTION

The present invention relates to methods for producing bevel gears having hypocycloidal teeth in the continuous indexing method and the use of corresponding face cutter heads.

BACKGROUND INFORMATION

There are various types of bevel gears, these types being differentiated, inter alia, on the basis of the profile of the longitudinal flank lines. The following bevel gears are differentiated according to the profile of the longitudinal flank lines:
 straight-toothed bevel gears
 helical-toothed bevel gears
 spiral-toothed bevel gears.

Bevel gear pair teeth can be uniquely established by the associated virtual plane gear teeth (if the pitch cone angles are known). The corresponding plane gear can also be imagined as a wafer-thin profile disc. The plane gear results from the bevel gear teeth in that the pitch cone angle is set to $\delta_p = 90°$. In general, every perpendicular section through a plane gear tooth has linear flanks. Bevel gears of a bevel gear pair have the same plane gear tooth count.

The term "spiral-toothed bevel gears" is presumed to have been taken from the American world, where these bevel gears are generally referred to as "spiral bevel gears." It would be better to use the term "arc-toothed bevel gears" instead of "spiral-toothed bevel gears" here, since the spiral already represents a special form of a curve (e.g., the Archimedean). However, the title "spiral-toothed bevel gears" is still used hereafter, as has established itself in practice.

In the case of spiral-toothed bevel gears, a further subdivision is possible with respect to the shape of the longitudinal flank line:
 circular arcs
 epicycloids, in particular extended epicycloids
 evolvents
 hypocycloids, in particular extended hypocycloids.

Circular-arc-toothed bevel gears have a circular arc as a longitudinal flank line. Circular-arc-toothed bevel gears are manufactured in the single indexing method (also referred to as intermittent indexing process, single indexing process, or face milling). The single indexing method is schematically shown in FIG. 1A. The cutter 21 of a cutter head 20 completes a circular movement while the bevel gear 11 to be produced rests in a fixed position. To manufacture further tooth gaps, the cutter head 20 is retracted and the workpiece 11 is rotated by an indexing angle. The step-by-step further rotation (counterclockwise here) is indicated in FIG. 1A by the arrows A, B, and C. Therefore, one tooth gap 22 is always manufactured at a time.

Epicycloidal, in particular expanded-epicycloidal (also referred to as extended-epicycloidal) toothed gearwheels are manufactured by a continuous indexing method (also referred to as continuous hobbing, continuous indexing process, or face hobbing). In the production of the epicycloids in the continuous indexing method, the ratio of plane gear tooth count $z_p$ of the bevel gear to number of passes $G_x$ of the bar cutter head (number of the cutter groups) corresponds to the ratio of the radius RG of the base circle GK and the radius RR of the pitch circle RK. One refers to an extended epicycloid when the cutter head nominal radius $r_c$, on which the blades of the cutter 23 are seated, is greater than the radius RR of the pitch circle RK (see FIG. 1B). In this continuous indexing method, both the cutter head and also the workpiece 11 rotate in a movement sequence that is chronologically adapted to one another. The indexing is thus performed continuously and gaps 12 and the corresponding teeth 13 are generated quasi-simultaneously. A corresponding example is shown in FIG. 1B. The cutter head rotates counterclockwise here, while the workpiece 11 rotates clockwise (this rotational movement is also referred to as plane gear rotation). An epicycloid (e.g., an extended epicycloid) is produced here. The movements thus occur here in opposite directions. If both rotate in the same direction, a hypocycloid is produced (as shown in FIG. 1C). FIG. 1B shows that the cutters 23 of a corresponding cutter head are typically situated in pairs (also referred to as in groups in the case of two, three, or more cutters per cutter group). FIG. 1B shows that the pitch circle RK of the cutter head rolls along the base circle GK of the workpiece 11. M refers to the center point of the cutter head here. This center point M is coincident with the center point of the pitch circle RK. The coupling of the two rotational movements is performed so that only one cutter pair, or one cutter group, moves through a tooth gap 12 in each case.

A bevel gear having a "linear" hypocycloid as a longitudinal flank line can be produced according to the principle shown in FIG. 2. The mathematical principle shown is known from various textbooks, but also from European Patent Application EP 1348509 A2. Fundamentally, this approach is also known from "Stanki dja obrabotki konitscheskich zubtschatych kolos," Izdanie 2-e, V. N. Kedrinskij, K. M. Pismanik, Izdatelstvo "Maschinostroenie" Moskva 1967, pages 506-508.

In order to obtain a hypocycloid, the pitch circle RK having the radius RR rolls in the interior of the fixed base circle GK having radius RG. The pitch circle RK rotates around its axis (center point M), as indicated by the arrow P1. As indicated by the arrow P2, the pitch circle RK rolls counterclockwise in the interior of the base circle GK (the rotational direction could also be reversed). The pointer Z1 is oriented radially outward fixed in place in the pitch circle RK and is associated with a generating point U on the circumference of the pitch circle RK. This point U is fixed in place in the coordinate system of the pitch circle RK, i.e., this point U is fixedly connected to the pitch circle RK. Through the rolling movement of the point U, i.e., through its own rotation around the point M coupled to the satellite movement around the center point of the base circle GK, the point U generates a hypocycloid HY in the x-y coordinate system of the base circle GK, or a straight line in the special case shown. The point U thus defines or describes a linear hypocycloid (HY), when the pitch circle RK rolls in the base circle GK. The cutter head radius $r_c$ is $r_c = RR$ here. The two circles RK and GK are shown in a Cartesian x-y coordinate system here.

The parameter representation in this x-y coordinate system reads as follows:

$$x = (RG - RR)\cos\lambda - RR\cos\frac{RG - RR}{RR}\lambda \quad (1)$$

$$y = (RG - RR)\sin\lambda - RR\sin\frac{RG - RR}{RR}\lambda \quad (2)$$

In equations (1) and (2), $\lambda$ represents the rotational angle of the center point M of the pitch circle RK in relation to the center point MG of the base circle GK. A snapshot is shown in FIG. 2 where the following applies: $\lambda=0$, x=RG, y=0. The coordinates of U are [RG, 0].

FIGS. 3A-3H show, on the basis of a sequence, that there is a special case in which the hypocycloid HY becomes a straight line. In these figures, the references and reference numerals were intentionally omitted, so as not to impair the clarity of the illustration. However, all features of FIG. 3A-3H that match the features of FIG. 2 are in accordance therewith. A straight line results when the condition RR=RG/2, or RG/RR=2, is met. It may be seen on the basis of FIGS. 3A-3H that the generating point U is displaced starting from the illustration in FIG. 3A ($\lambda=0°$) along the x-axis from the coordinate position [RG, 0] to the left to the coordinate position [−RG, 0]. In FIG. 3E ($\lambda=180°$), the coordinate position [−RG, 0] is reached. The pitch circle RK now rolls through the two lower quadrants of the x-y coordinate system and the point U moves from the coordinate position [−RG, 0] back to the coordinate position [RG, 0]. The straight line HY is a distance which extends in the figures along the x-axis from [RG, 0] to [−RG, 0].

Special shapes of hypocycloids can also be explained on the basis of the figure shown. The special shapes are generated as follows. If the generating point U is inside or outside the pitch circle RK, one refers to either an abbreviated hypocycloid or correspondingly to an extended hypocycloid. The distance between the center M (see FIG. 2) of the pitch circle RK and the position of the generating point U is described by the parameter c. Therefore, c<RR generates an abbreviated hypocycloid and c>RR generates an extended hypocycloid. An extended hypocycloid having c=1.5 RR is shown in FIG. 4A. The pointer Z2 thus has the length c=1.5 RR (the variable c corresponds to the cutter head nominal radius $r_c$ in FIG. 1B). The cutter head nominal radius $r_c$ is thus $r_c$=1.5 RR here. An abbreviated hypocycloid having c=0.5 RR is shown in FIG. 4B. The pointer Z3 thus has the length c=0.5 RR. The cutter head nominal radius $r_c$ is thus $r_c$=0.5 RR here. In each case an ellipse is generated as the hypocycloid HY, whose parameter representation as a function of the angle $\lambda$ in the x-y coordinate system reads as follows:

$$x = \left(\frac{RG}{2} + c\right)\cos\left(\frac{\lambda}{2}\right) \quad (3)$$

$$y = \left(\frac{RG}{2} - c\right)\sin\left(\frac{\lambda}{2}\right) \quad (4)$$

If c=RR and RR=RG/2, the linear hypocycloid is obtained as a special case, as already described.

In the face cutter heads, which are used to produce bevel gears, one differentiates between so-called bar cutter heads and profile cutter heads. A bar cutter head is equipped with a large number of bar cutters (e.g., forty), each bar cutter having a shaft and a head area. The head area can be given a desired shape and position by grinding the bar cutter. Bar cutter heads are more productive than profile cutter heads, which contain fewer cutters, and the bar cutters can be re-profiled. In contrast, a profile cutter head is equipped with relief-ground cutters. These die cutters (also referred to as profile cutters) maintain their profile shape on the machining surface upon re-grinding. It is an advantage of bevel gear milling using profile cutters that no special grinding machine is required for the re-grinding of these die cutters. The known Zyklo-Palloid® method, for example, uses such profile cutters to produce spiral bevel gears.

The present invention is concerned with the milling of bevel gears having hypocycloidal teeth and in particular the milling of straight-toothed bevel gears.

The methods currently used for milling straight-toothed bevel gears are hobbing (names of known hobbing methods include: Coniflex®, Konvoid, and Sferoid™) and broaching (also known as the Revacycle® method). Two disc-shaped cutter heads of equal size are used in the case of hobbing, in which the cutters on the outer circumference point radially outward. The axes of the two cutter heads are inclined to one another, so that at the narrowest point the cutters of one cutter head may engage between the cutters of the other. One cutter head is thus used for the left flanks and one cutter head is used for the right flanks. This hobbing of straight-toothed bevel gears is a single indexing method, in which crown gear and bevel gear pinions are hobbed. The broaching method is also a single indexing method in which, the tooth flanks of the crown gear and bevel gear pinions are not generated by envelope cuts as in hobbing. Rather, the cutter profiles in broaching exactly correspond to the shape of the final gap profile of the bevel gear. The broaching method is more productive than hobbing in the single indexing method, but has the disadvantage that a special disc-shaped broaching cutter head having a plurality of various die cutters on the circumference is required for almost every bevel gear (transmission ratio).

These examples prove that the tool expenditure can be too large and costly for many users to be able to produce various bevel gears having hypocycloidal teeth and in particular various straight-toothed bevel gears.

SUMMARY OF THE INVENTION

Accordingly, it is an object of the present invention to overcome one or more of the above-described drawbacks and/or disadvantages of the prior art, and to provide a cost-effective solution which allows various bevel gears having hypocycloidal teeth and various straight-toothed bevel gears to be manufactured using the fewest tools possible.

In one aspect, a method for producing bevel gears having hypoid teeth, e.g., straight-toothed bevel gears, having different plane gear tooth counts using an all-purpose face cutter head comprises the following steps executed to produce a first bevel gear. The all-purpose face cutter head is equipped in a first configuration with a first number of cutter groups, which corresponds to a first number of passes. A first bevel gear is then produced in the continuous indexing method using the all-purpose face cutter head in the first configuration. To produce a second bevel gear having a different plane gear tooth count than the first, the following steps are executed. The same all-purpose face cutter head is equipped in a second configuration with a second number of cutter groups, which corresponds to a second number of passes. The second bevel gear is then produced in the continuous indexing method using the all-purpose face cutter head in the second configuration.

Some advantages of the present invention are listed hereafter. According to the present invention, at least two bevel gears having hypoid teeth, which differ in their plane gear tooth count, can be produced using only one all-purpose face cutter head. In the special case, straight-toothed bevel gears or bevel gears having only slightly curved hypoid teeth can also be produced. In some embodiments, more than two different bevel gears having hypoid teeth can be produced using one all-purpose face cutter head, depending on the configuration. The costs are thus reduced for storage and handling. In addition, flexibility is increased if multiple different bevel gears can be produced using one all-purpose face cutter head.

These and other advantages and features of the invention will become more readily apparent from the following description of embodiments of the invention, which are to be understood not to be limiting and which will be explained in detail below with reference to the drawings.

DETAILED DESCRIPTION OF EMBODIMENTS OF THE INVENTION

Terms are used in connection with the present description that are also used in relevant publications and patents. However, it is to be noted that the use of these terms is only to serve for better understanding. The ideas according to the invention and the scope of protection of the patent claims are not to be restricted in their interpretation by the specific selection of the terms. The invention may be readily transferred to other term systems and/or technical fields. The terms are to be applied accordingly in other technical fields.

The present invention is directed to the production of bevel gears having hypocycloidal teeth. In particular, these are bevel gears having hypocycloidal straight teeth. Hypocycloidal teeth are to be understood in the present case as teeth having a longitudinal flank line that is defined by a hypocycloid. Hypocycloidal straight teeth are to be understood in the present case as teeth having a longitudinal flank line that corresponds to a straight line or approximates a straight line. An approximately straight line is understood here as an extended or abbreviated hypocycloid whose radius of curvature is greater than 1000 mm. This radius of curvature is hardly recognizable or perceptible at the typical tooth widths and will therefore be considered as hypocycloidal straight teeth in the context of the present invention.

Figure 6:
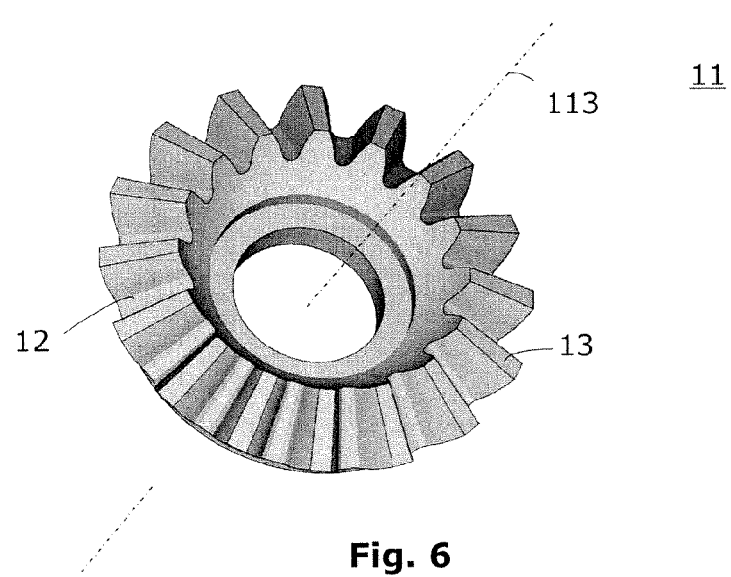
FIG. 6 is a schematic perspective view of a bevel gear pinion having straight teeth.

In the design and production of a bevel gear 11 (see FIG. 6, for example), a level, virtual plane gear is typically used (also referred to as a reference plane gear according to the German Institute of Standardization Standard—DIN 3971), similarly to the virtual toothed rack in the case of a spur gear. There is a fixed transmission ratio between the plane gear 14 and the face cutter head 240 to be used, which is referred to as the coupling. This is because the rotation of the face cutter head 240, and the rotation of the bevel gear 11 to be machined, are coupled during the continuous indexing method in such a way that only one cutter group of the face cutter head 240 moves through a tooth gap 12 of the bevel gear 11 at a time, and the next cutter group moves through the next gap 12. The plane gear 14 has a plane gear tooth count $z_p$, as mentioned previously. This plane gear tooth count $z_p$ is an operand and is therefore typically not an integer (see formula (5)). The ratio of the plane gear tooth count $z_p$ to the number of passes $G_x$ of the face cutter head corresponds to the ratio of the base circle radius RG to the pitch circle radius RR. The number of passes $G_x$ of the face cutter head corresponds to the number of cutter groups, and is also referred to as the cutter group count $z_0$. For milled bevel gears 11, the plane gear tooth count $z_p$ results from the following equation, equation (5):

$$z_p = \frac{z}{\sin\delta} \tag{5}$$

where z is the tooth count of the bevel gear 11 and $\delta$ is the pitch cone angle of the bevel gear 11.

Figure 5:
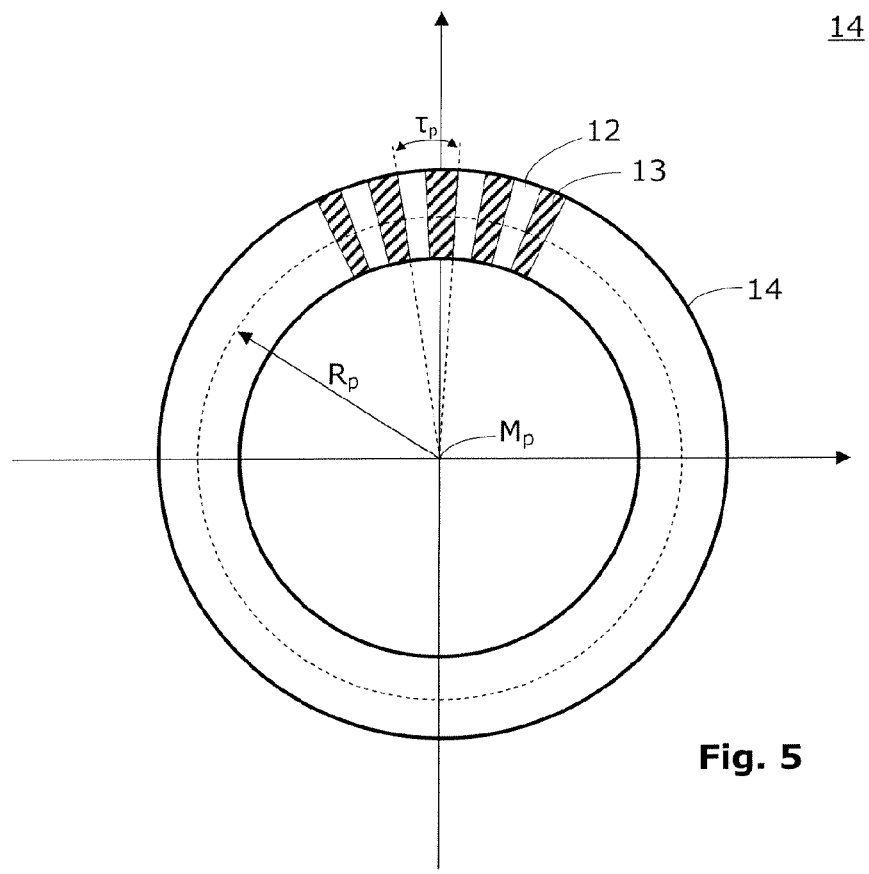
FIG. 5 is a schematic illustration of a bevel gear having straight teeth, only a part of the teeth being shown.

A schematic illustration of a plane gear 14 having hypocycloidal straight teeth is shown in FIG. 5, with only some of the teeth 13 (in the illustrated case, five teeth) being shown shaded. The following equation, equation (6), applies for such a plane gear 14:

$$\tau_p = \frac{m_p \cdot \pi}{R_p} = \frac{2 \cdot \pi}{z_p} \tag{6}$$

The plane gear pitch angle $\tau_p$ can be calculated on the basis of equation (6), if (plane gear) modulus $m_p$ and plane gear radius $R_p$ are known or if plane gear tooth count $z_p$ is known. FIG. 5 shows that, in the case of a straight-toothed bevel gear 11, the reference flank lines (flank line) are straight lines, which typically go radially through the plane gear center $M_p$.

Thus, all required pitch cone parameters for a bevel gear pair can be calculated on the basis of the number of cutter groups $z_0$, which is shown in the following equation, equation (7), as a ratio to the plane gear tooth count $z_p$:

$$\frac{z_p}{z_0} = \frac{RG}{RR} = \frac{\frac{z}{\sin\delta}}{G_x} \quad (7)$$

The corresponding relevant formulas are known in the art. Details can be taken, for example, from the book "Kegelräder; Grundlagen, Anwendungen [Bevel Gears; Foundations, Applications]", Jan Klingelnberg, Springer Verlag, 2008, where the corresponding formulas are shown on page 39 et seq.

Universally usable face cutter heads 240 (see FIGS. 8A-8C and 9A-9C) can be calculated and produced on the basis of these calculations, which can be used for the purpose of producing at least two different bevel gears having hypoid teeth using the same face cutter head 240.

Figure 7:
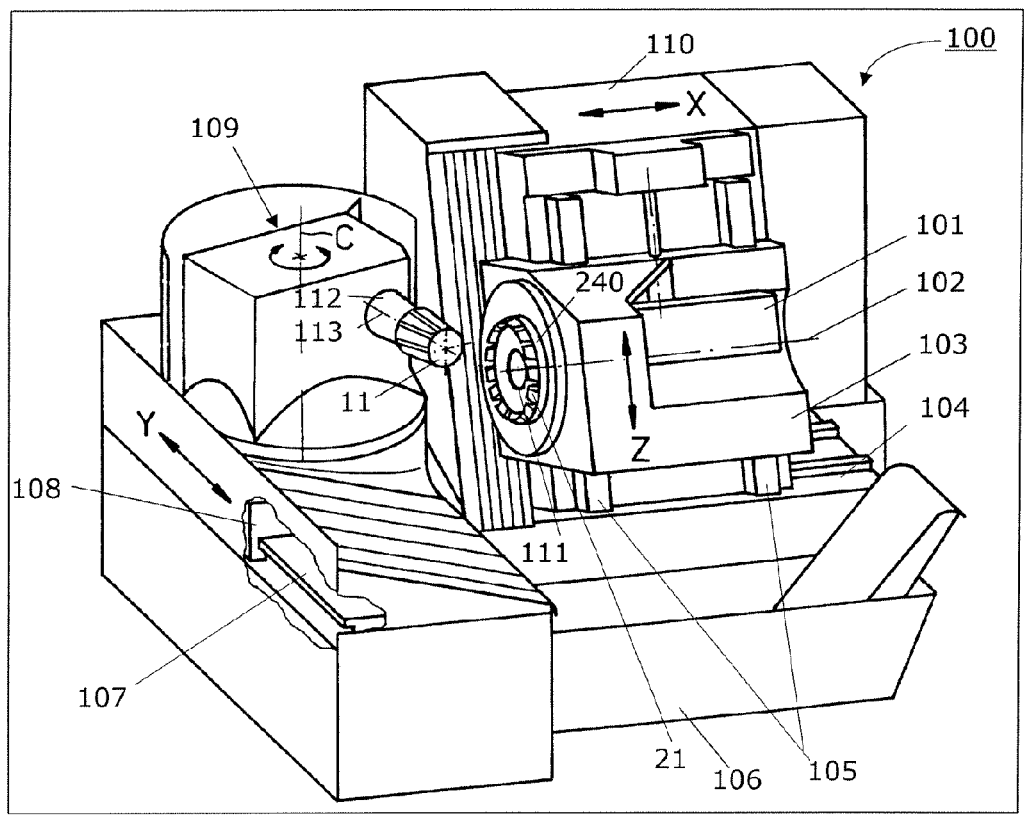
FIG. 7 is a perspective view of a bevel gear cutting machine.

FIG. 7 shows a perspective view of the basic construction of a corresponding CNC machine 100 (also referred to as a bevel gear cutting machine) for gear cutting of bevel gears 11, bevel gear pinions 11 having hypoid teeth and crown wheels having hypoid teeth.

The CNC machine 100 can be constructed as follows. A machine housing 110 is guided horizontally and linearly along a linear coordinate axis X (first axis) on a machine bed 106. A first carriage 103 is vertically movable along a linear coordinate axis Z (second axis) using a spindle drive 101 on a guide 105, which is attached to a lateral surface of the machine housing 110. A workpiece spindle carrier is guided horizontally and linearly on a guide 107 on the machine bed 104 along a linear coordinate axis Y (third axis), which is perpendicular to the X-axis of the CNC machine 100 shown in FIG. 7. A first pivot device 109 having a vertical axis C (fourth axis) is located on the carriage 108. The guide 105 of the first carriage 103 and the Z-axis are inclined toward a vertical orientation in the CNC machine 100 shown in FIG. 7.

The first carriage 103 carries a tool spindle 111, which is mounted so it is rotatable around a tool spindle axis 102 (fifth axis). The tool spindle 111 carries a tool, for example, an all-purpose face cutter head 240 having multiple bar cutters 21. A workpiece spindle 112 is horizontally guided on the machine bed 106 and is linearly displaceable or pivotable by the second carriage 108 and by the first pivot device 109. The first pivot device 109 carries the workpiece spindle 112, which is rotatable around a workpiece spindle axis 113 (sixth axis). The workpiece spindle 112 carries a workpiece 11, in the illustrated example is a straight-toothed bevel gear pinion 11. The first pivot device 109 is pivotable about and horizontally guided along the C axis, in order to pivot the workpiece 11 into a machining position. The workpiece spindle 112 can be provided with a chuck to chuck the workpiece 11.

Figure 8A:
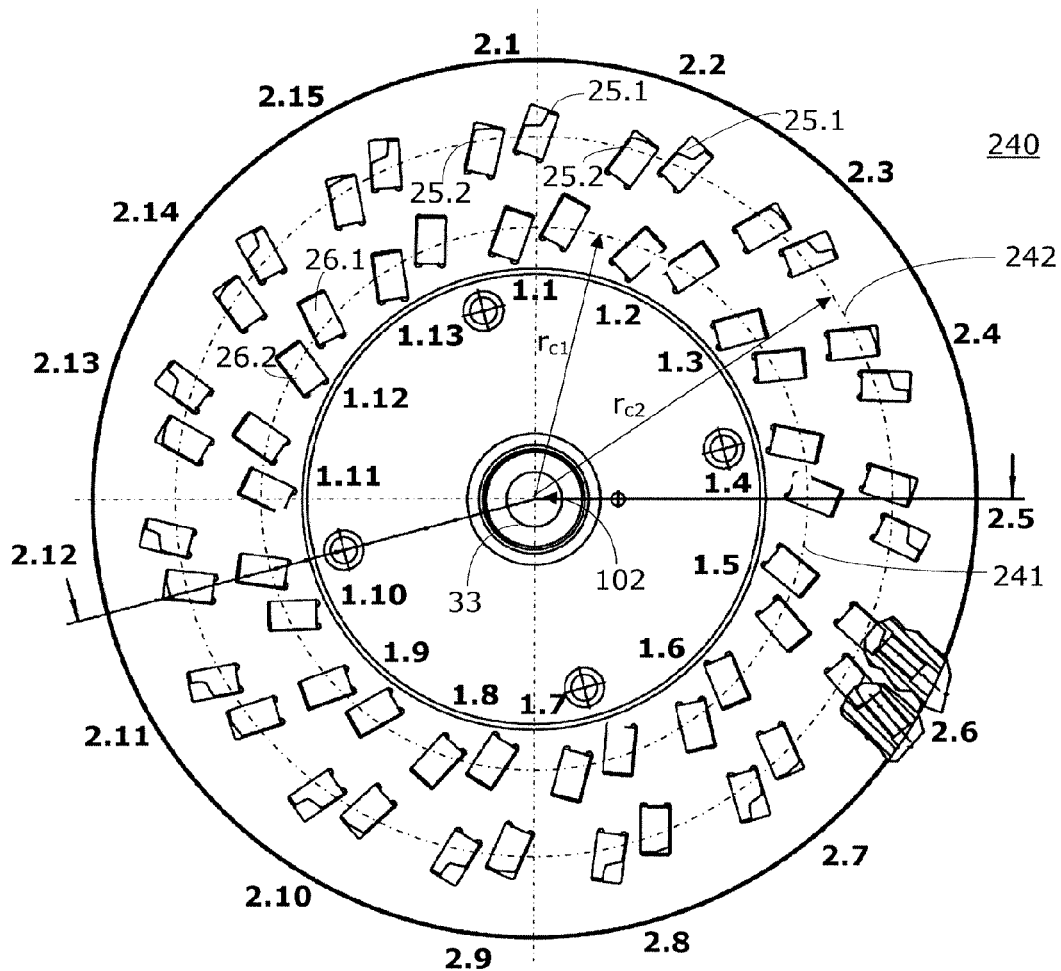
FIG. 8A is a schematic top view of an all-purpose face cutter head according to a first embodiment of the present invention.
Figure 8B:
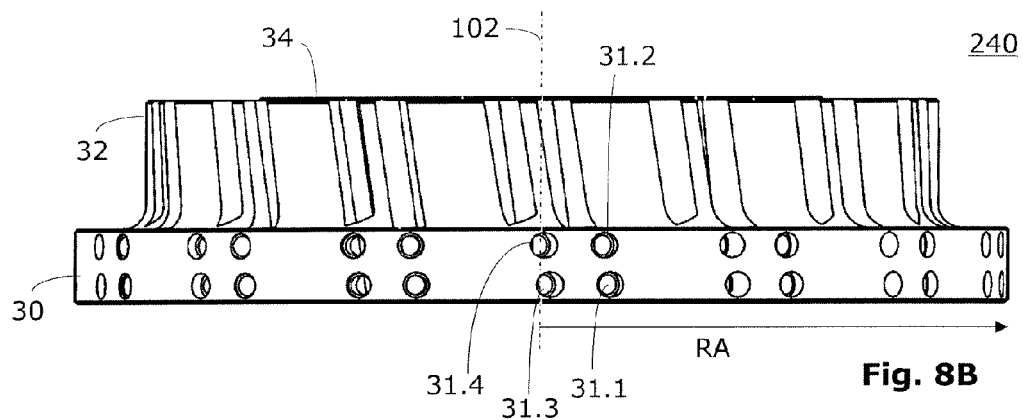
FIG. 8B is a schematic side view of the all-purpose face cutter head according to FIG. 8A.
Figure 8C:
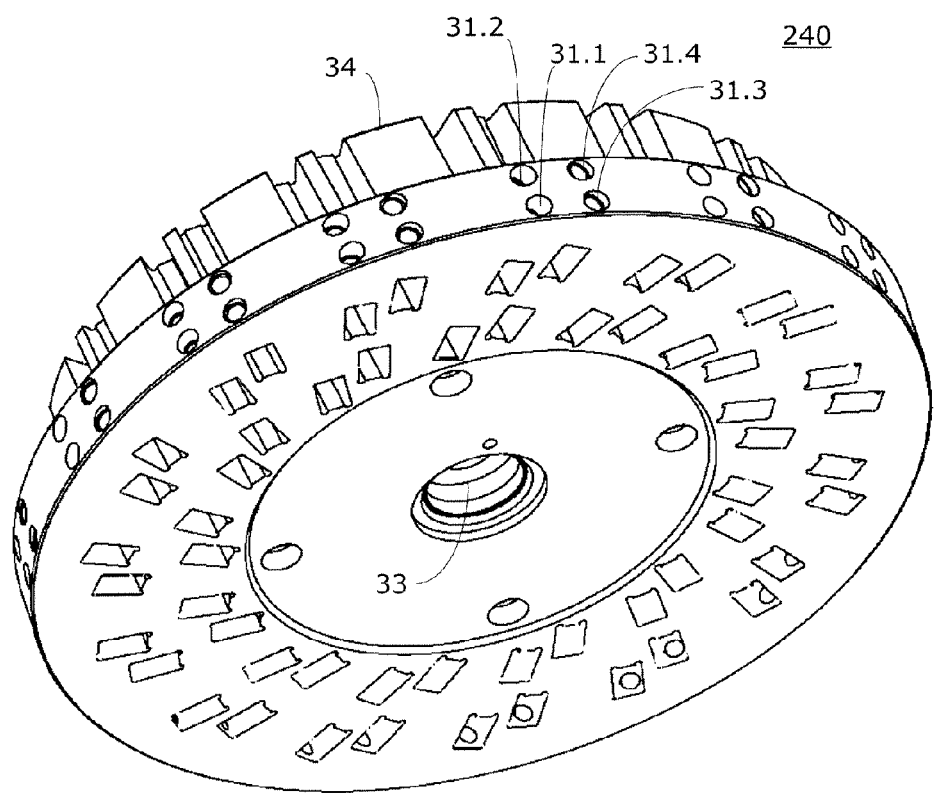
FIG. 8C is a schematic perspective view of the all-purpose face cutter head according to FIG. 8A.
Figure 9A:
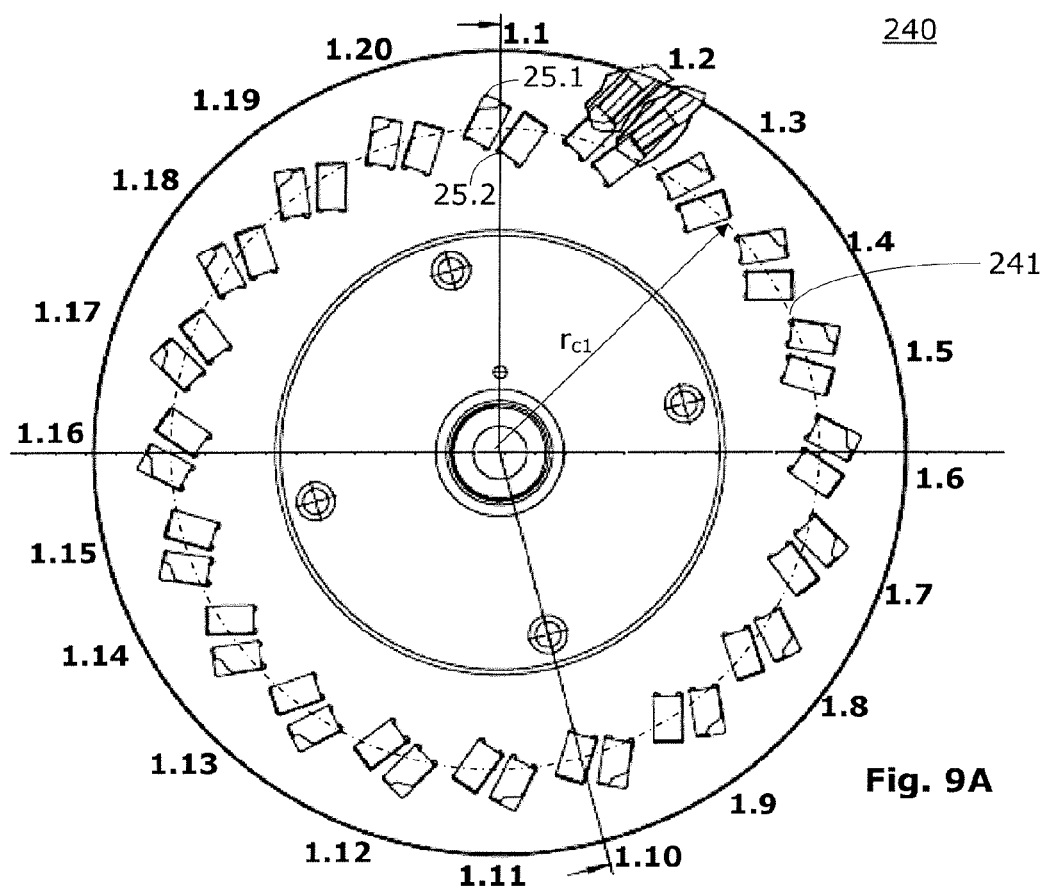
FIG. 9A is a schematic top view of an all-purpose face cutter head according to a second embodiment of the present invention.
Figure 9B:
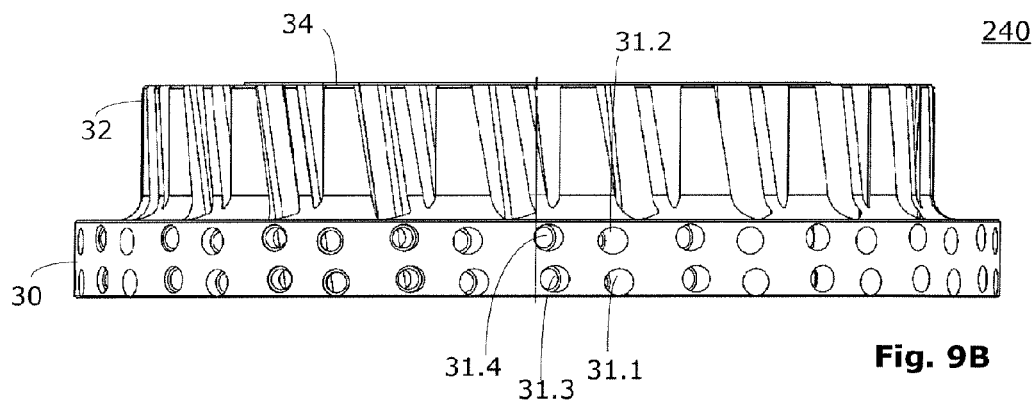
FIG. 9B is a schematic side view of the all-purpose face cutter head according to FIG. 9A.
Figure 9C:
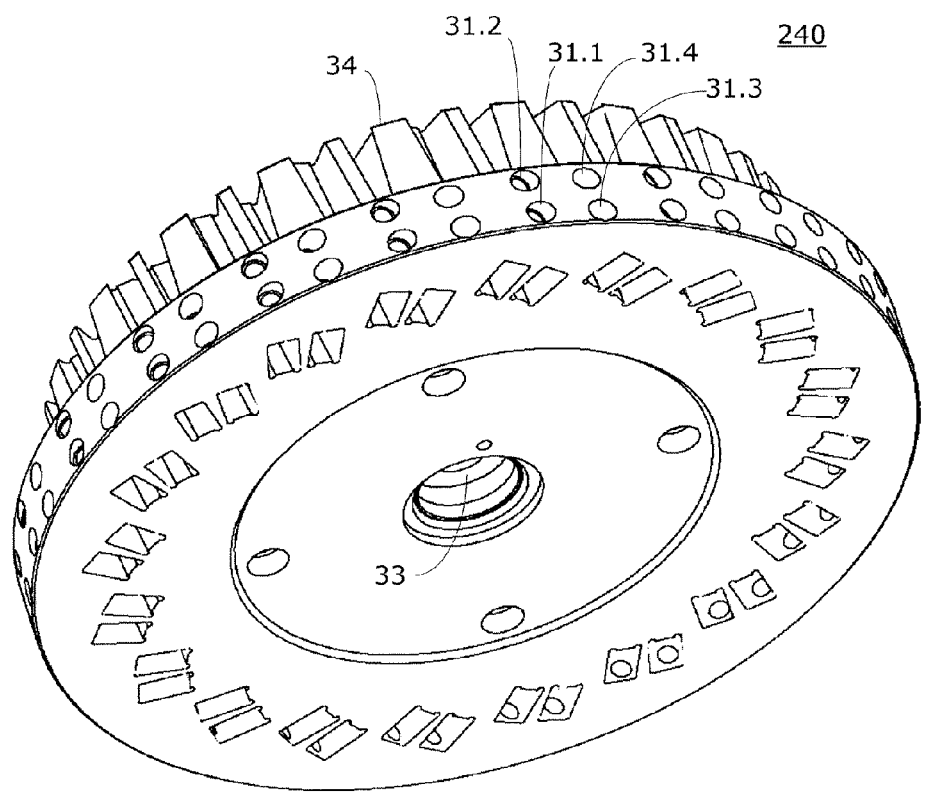
FIG. 9C is a schematic perspective view of the all-purpose face cutter head according to FIG. 9A.

An all-purpose face cutter head 240 has either
(1) only one fixed cutter head nominal radius $r_c$ (also referred to as the orbit radius) and a maximum number of passes $G_{max}$, which is an even number and which can be divided at least once by a whole number $G_G$, which is greater than or equal to two (an example of such a face cutter head 240 is shown in FIGS. 9A-9C); or
(2) at least two fixed cutter head nominal radii $r_{c1}$ and $r_{c2}$, as well as
 A. a first number of passes $G_{1max}$, which establishes the number of cutter groups which can be situated on the first cutter head nominal radius $r_{c1}$, and B. a second number of passes $G_{2max}$, which establishes the number of cutter groups which can be situated on the second cutter head nominal radius $r_{c2}$ (an example of such a face cutter head 240 is shown in FIGS. 8A-8C).

In case (1) above, depending on how the first all-purpose face cutter head 240 is equipped, either a first bevel gear 11 having hypocycloidal teeth can be produced, $z_0$ corresponding to the maximum number of passes $G_{max}$ ($z_0$ is the number of cutter groups), or a second bevel gear 11 having hypocycloidal teeth can be produced using the first all-purpose face cutter head 240, $z_0$ corresponding to a number of passes $G_x$, which results through a division of the maximum number of passes $G_{max}$ by the number $G_G$. A corresponding example of such a face cutter head 240 is explained in connection with FIGS. 9A-9C.

In case (2)A, a bevel gear 11 having hypocycloidal teeth can be produced, with $z_0$ corresponding to the first number of passes $G_{1max}$. In case (2)B, another bevel gear 11 having hypocycloidal teeth can be produced, with $z_0$ corresponding to the second number of passes $G_{2max}$.

At least two different bevel gears 11 having hypocycloidal teeth can be produced, both using a first all-purpose face cutter head according to case (1), and also using a second all-purpose face cutter head according to case (2) A/(2)B.

A first all-purpose face cutter head 240 can thus be equipped in a first configuration with the maximum possible number of cutter groups $G_{max}$, in order to produce a first bevel gear 11 having hypocycloidal teeth. The maximum number of passes $G_{max}$ is an even number in some embodiments. This first bevel gear 11 is defined by a ratio of plane gear tooth count $z_p$ to the maximum number of passes $G_{max}$ (equal to the number of cutter groups $z_0$) of the first all-purpose face cutter head 240. If one wishes to produce a straight-toothed bevel gear 11 having hypocycloidal teeth, the ratio of base circle radius RG to pitch circle radius RR can be selected as RG/RR=2.

In a second configuration, the same first all-purpose face cutter head 240 can be equipped with a smaller number $G_x$ of cutter groups, this number $G_x$ of cutter groups resulting from a division of the maximum number of passes $G_{max}$ by a whole number $G_G \geq 2$. In this second configuration, a second bevel gear 11 having hypocycloidal teeth can be generated. If this second bevel gear 11 is also to have straight teeth, the following condition can be selected: the ratio of plane gear tooth count $z_p$ to the number of passes $G_x$ (equal to the number of cutter groups $z_0$) of the first all-purpose face cutter head 240 is defined by the ratio of base circle radius RG to pitch circle radius RR, with RG/RR=2.

Such a first all-purpose face cutter head 240 may thus be used to produce at least two different bevel gears 11 having hypocycloidal teeth. The tool and storage costs are thus reduced.

With a suitable selection of the maximum number of passes $G_{max}$, one can thus, as described, use the same all-purpose face cutter head 240 for the production of more than two different bevel gears 11 having hypocycloidal teeth. In this case, the maximum number of passes $G_{max}$ is selected so that it is divisible by multiple whole numbers greater than or equal to two. This is illustrated hereafter by way of an example.

In the case of a plane gear tooth count of 48.7, for example, a face cutter head 240 can be used which, for example, has either a number of passes equaling 24 or a number of passes equaling 25. It must be rounded up or down here, since number of passes $G_x$ must be an integer.

If the maximum number of passes of a face cutter head 240 is $G_{max}$=48, the following configurations shown in Table 1 result. It is to be noted here that plane gear tooth counts $z_p$ that are smaller than 8 are less technologically expedient.

TABLE 1

Summary of all-purpose face cutter head configurations where maximum number of passes of a face cutter head is $G_{max} = 48$

| Maximum number of passes $G_{max} =$ 48 | $G_G$ (divisor) | Number of passes in the respective configuration | Plane gear tooth count $z_p$ for hypocycloidal, ideally linear longitudinal flank line (RR = RG/2) | Typical plane gear tooth count for hypocycloidal nonlinear longitudinal flank line RG/RR ≠ 2 and c ≠ RR |
|---|---|---|---|---|
| first bevel gear | 1 | 48 | Approx. 96 | 91.2 < z < 108 |
| second bevel gear | 2 | 24 | Approx. 48 | 45.6 < z < 50.4 |
| third bevel gear | 3 | 16 | Approx. 36 | 30.4 < z < 33.6 |
| fourth bevel gear | 4 | 12 | Approx. 24 | 22.8 < z < 52.2 |
| fifth bevel gear | 6 | 8 | Approx. 16 | 15.2 < z < 16.8 |
| sixth bevel gear | 8 | 6 | Approx. 12 | 11.4 < z < 12.6 |
| seventh bevel gear | 12 | 4 | Approx. 8 | 7.6 < z < 8.4 |

Figure 1A:
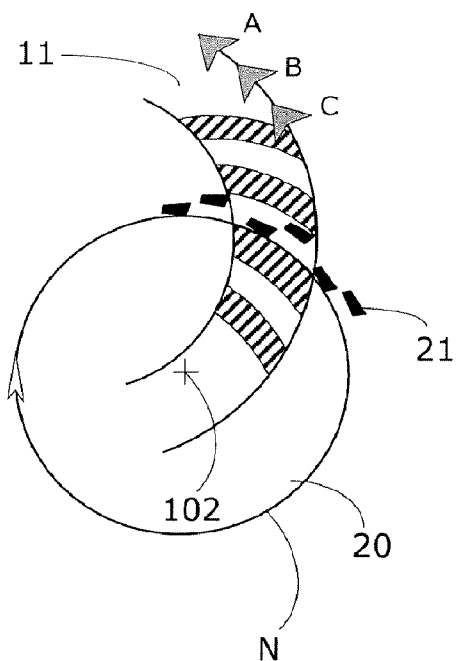
FIG. 1A is a schematic illustration of a single indexing method according to the prior art.
Figure 1B:
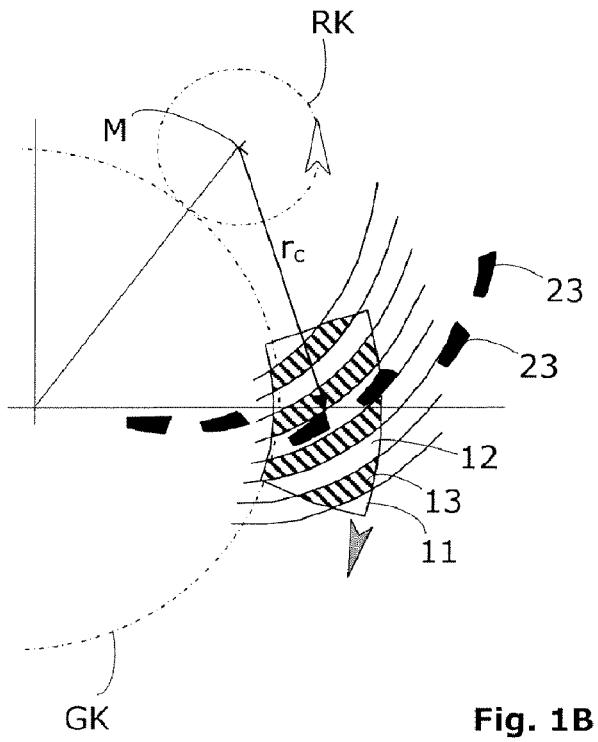
FIG. 1B is a schematic illustration of a continuous indexing method according to the prior art and generating an epicycloid.
Figure 1C:
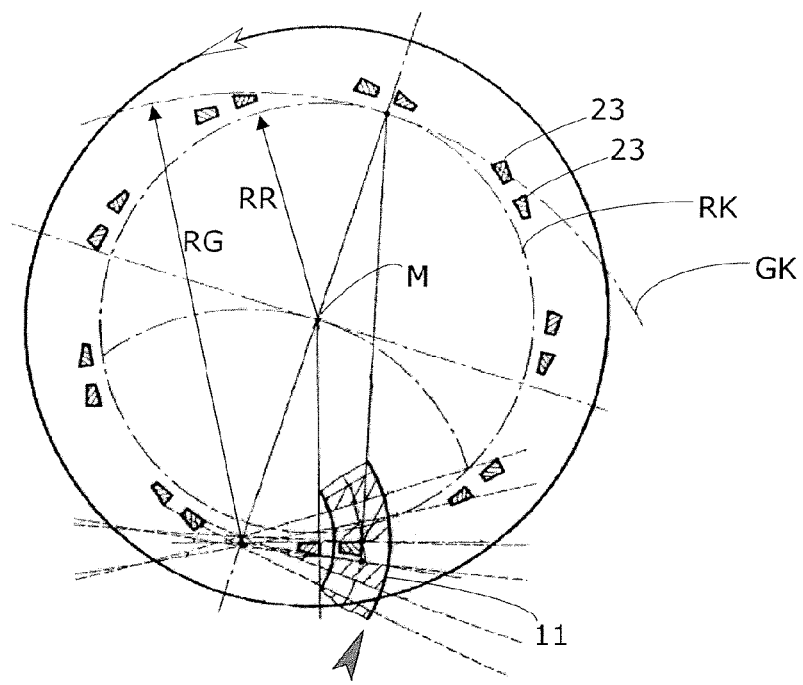
FIG. 1C is a schematic illustration of the continuous indexing method according to the prior art and generating an epicycloid.
Figure 2:
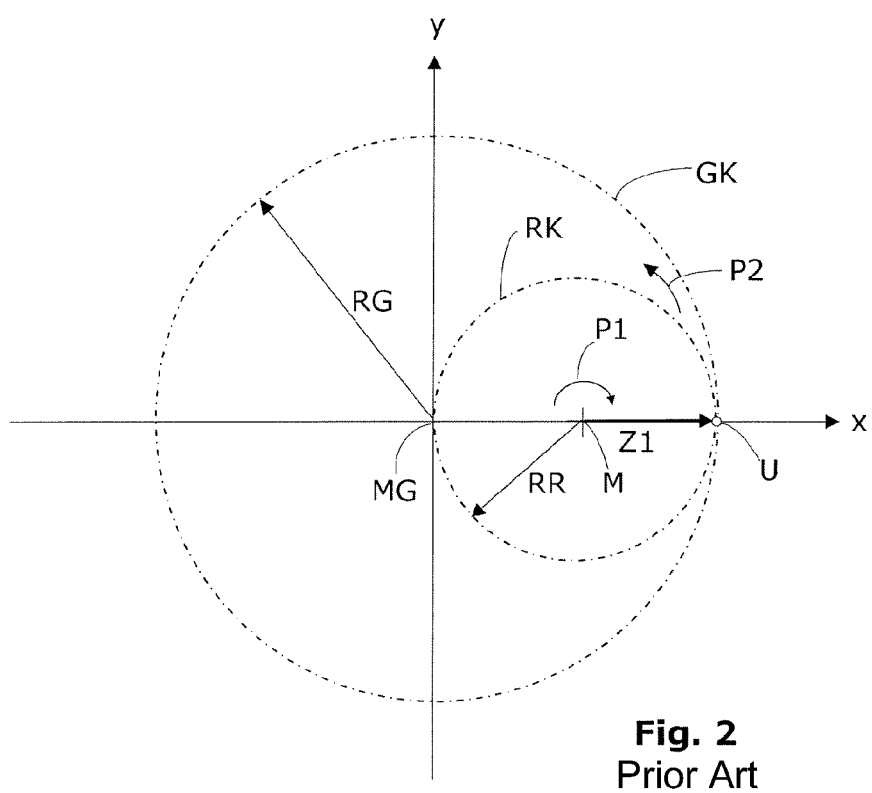
FIG. 2 is a schematic illustration according to the prior art showing the generation of a hypocycloid.
Figure 3A:
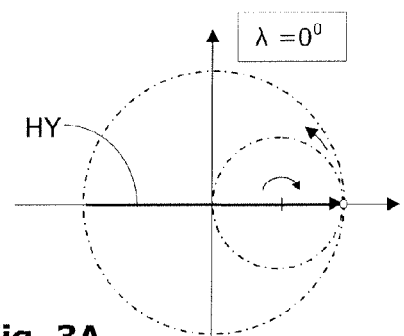
FIGS. 3A-3H are schematic, step-by-step illustrations of the generation of a linear hypocycloid according to the prior art.
Figure 3E:
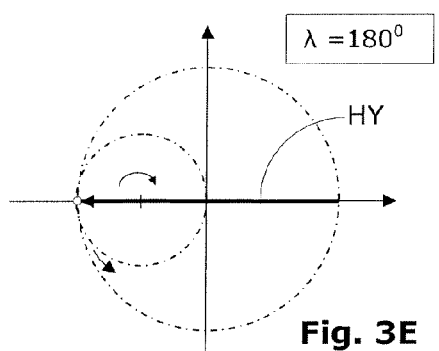
Figure 3B:
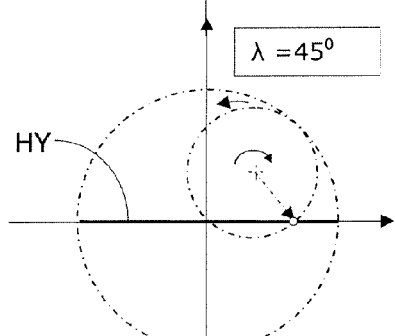
Figure 3F:
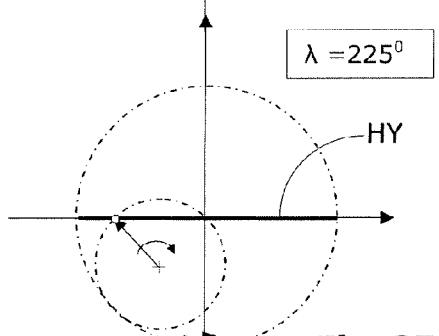
Figure 3C:
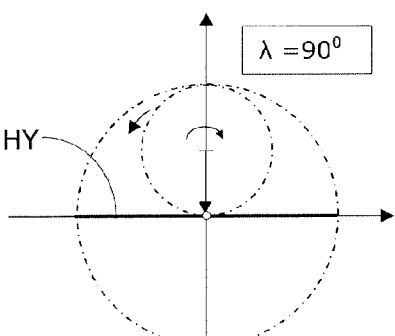
Figure 3G:
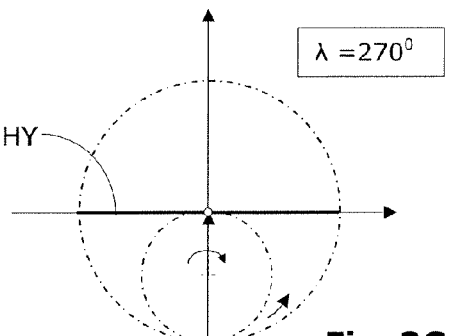
Figure 3D:
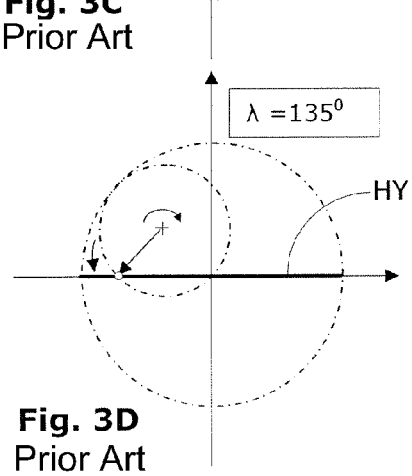
Figure 3H:
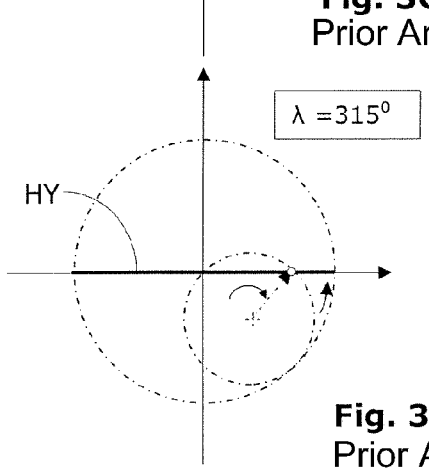
Figure 4A:
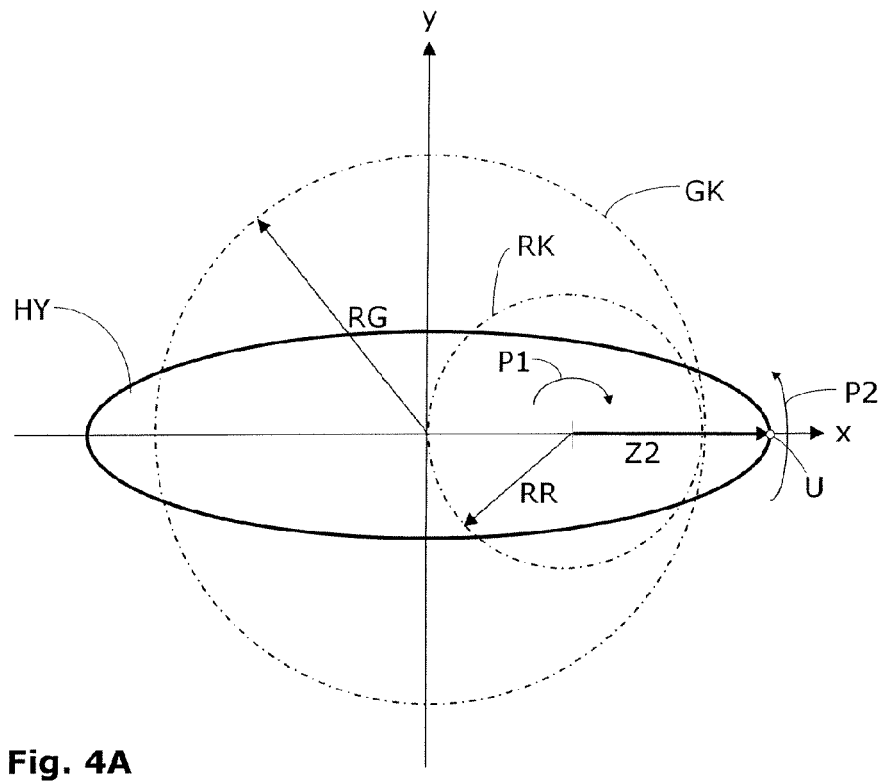
FIG. 4A is a schematic illustration of the generation of an elliptical hypocycloid (extended hypocycloid) according to the prior art.
Figure 4B:
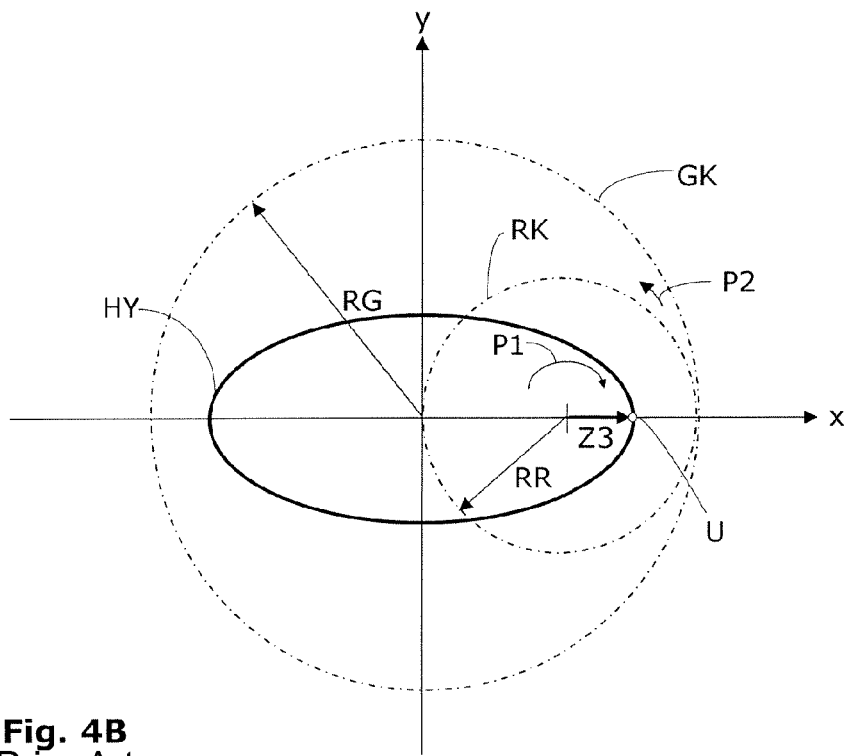
FIG. 4B is a schematic illustration of the generation of an elliptical hypocycloid (abbreviated hypocycloid) according to the prior art.

The present invention thus includes a face cutter head method for producing bevel gears 11 having hypocycloidal teeth in the continuous indexing method. An all-purpose face cutter head 240 is used, which moves in the same direction as the bevel gear 11 (see FIG. 1C). The all-purpose face cutter head 240 has a cutter head nominal radius $r_c$ and a maximum number of passes $G_{max}$, which is divisible at least once by a whole number $G_G$, which is greater than or equal to two. Under these conditions, the all-purpose face cutter head 240 can be used to produce at least two different bevel gears 11 having hypocycloidal teeth as follows:

Equipping the all-purpose face cutter head 240 with a maximum number of cutter groups, which corresponds to the maximum number of passes $G_{max}$, and Producing a first bevel gear 11 having hypocycloidal teeth.

The same all-purpose face cutter head 240 can then be reequipped, a second number of cutter groups being used this time, which corresponds to a number of passes $G_x$, which results from a division of the maximum number of passes $G_{max}$ by the whole number $G_G$ (i.e., $G_x = G_{max}/G_G$).

The production of a second bevel gear 11 having hypocycloidal teeth then follows.

In the above-described example, two different bevel gears 11 having teeth 13, which have hypocycloidal longitudinal flanks, results.

The above-described approach can also be used if the following ratio is specified: RG/RR=2. In this case, bevel gears having straight-toothed hypocycloids are produced. If RG/RR≠2 here, and the ratio of RG/RR only slightly deviates from 2, a hypocycloidal longitudinal flank line results which is nearly linear, since its radius of curvature is greater than 1000 mm.

An exemplary bevel gear 11 having straight teeth can have, for example, a plane gear tooth count $z_p$=29.69848 and a tooth count z=21. The following parameters (according to DIN 3966) further characterize such a bevel gear: modulus $m_p$=4.233, pitch cone angle δ=45°, outer pitch circle diameter $d_e$=80.90 mm, and outer pitch cone length $R_e$=62.862 mm. In order to be able to produce linear hypocycloidal teeth with a plane gear tooth count $z_p$=29.69848, a face cutter head 240 is used which has a number of passes $G_x$ of $z_p/2$=14.84924. Since the number of passes $G_x$ is an integer, the number of passes $G_x$ is either 14 or 15 here. Therefore, a face cutter head 240 according to FIG. 8A can be used, in which $G_{2max}$=15.

A schematic top view of a face cutter head 240 is shown in FIG. 8A, which is designed for the purpose of being able to produce various bevel gears 11 having hypocycloidal teeth depending on the equipment/configuration. The face cutter head 240 shown has a first number $G_{1max}$ of receptacle openings 26.1, 26.2, which are situated along a first nominal circle 241 having cutter head nominal circle radius $r_{c1}$. The reference numeral 26.1 identifies the receptacle openings for outer cutters and the reference numeral 26.2 identifies the receptacle opening for inner cutters of the first (inner) nominal circle 241, which is also referred to as an orbit.

In addition, the face cutter head 240 has a second number $G_{2max}$ of receptacle openings 25.1, 25.2, which are situated along a second (outer) nominal circle 242 having cutter head nominal circle radius $r_{c2}$. The reference numeral 25.1 identifies the receptacle openings for outer cutters and the reference numeral 25.2 identifies the receptacle openings for inner cutters of the second (outer) nominal circle 242, which is also referred to as an orbit.

A bar cutter set comprises multiple (bar) cutter groups. The numbers $G_{1max}$ and $G_{2max}$ specify the maximum number of the cutter groups per nominal circle 241 and 242. In the example shown, $G_{2max}$=15 and $G_{1max}$=13. Each cutter group comprises n1=2 and n2=2 bar cutters (one inner cutter and one outer cutter in each case). It is also possible that each cutter group comprises more than two bar cutters. The positions of the individual cutter groups are identified here by numbers 2.1 to 2.15 for the outer nominal circle 242 and by the numbers 1.1 to 1.13 for the inner nominal circle 241.

For the outer cutter of a cutter set, a receptacle opening 25.1 is provided at the position 2.1. The receptacle opening 25.2 for the inner cutter of this cutter set is located at the position 2.1 pivoted at a small angle counterclockwise. All outer cutters of this cutter set are seated on or along the concentric cutter head nominal circle 242 having cutter head nominal radius $r_{c2}$. All inner cutters of this cutter set are seated on or along the concentric cutter head nominal circle 242 having a cutter head nominal radius $r_{c2}$. For example, $r_{c2}$ is 5"/2 (=2.5 inches=63.5 mm) here.

For example, a receptacle opening 26.1 is provided for the outer cutter of a further cutter set at the position 1.12. The receptacle opening 26.2 for the inner cutter of this cutter set is located at the position 1.12, pivoted at a small angle counterclockwise. All outer cutters of this cutter set are seated on the concentric first cutter head nominal circle 241 having cutter head nominal radius $r_{c1}$. All inner cutters of this cutter set are seated on the concentric first cutter head nominal circle 241 having a cutter head nominal radius $r_{c1}$. For example, $r_{c1}$ is 3.75"/2 (=1.875 inches=47.625 mm) here.

The external diameter (which equals 2*RA) of the face cutter head 240 (see FIG. 8B) results from the largest cutter head nominal diameter $2*r_{c2}$, which can be housed on the face cutter head 240. If the largest cutter head nominal diameter is, for example, $2*r_{c1}$=7.5" (7.5 inches=190.5 mm), the external diameter may be approximately 268 mm. If the largest cutter head nominal diameter is, for example, $2*r_{c2}$=3.75" (3.75 inches=95.25 mm), the external diameter may be approximately 165 mm.

The concentric cutter head nominal circles 241, 242 all have a common center point M, which is coincident with the tool spindle axis 102 of the bar cutter head 240.

Such a face cutter head 240, which is shown in FIGS. 8A-8C, can replace two existing cutter heads (one 3.75" and one 5" cutter head). If the cutter head 240 is completely equipped (i.e., the number of the cutter groups corresponds to $G_{1max}$) with the bar cutters of a first cutter set, a first bevel gear 11 having a first hypocycloidal tooth geometry can be manufactured. If the face cutter head 240 is completely equipped (i.e., the number of the cutter groups corresponds to $G_{2max}$) with the bar cutters of a second cutter set, a second different bevel gear 11 having a different hypocycloidal tooth geometry can be manufactured.

However, the face cutter head 240 can also be equipped along the outer nominal circle 242 with a smaller number ($G_x < G_{2max}$) of bar cutters. The number $G_{2max} = 15$ can be divided by the whole numbers $G_G = 3$ and $G_G = 5$. Therefore, the face cutter head 240 can be equipped in a further configuration along the outer nominal circle 242, for example, with $G_x = 5$ or with $G_x = 3$ cutter groups. If the face cutter head 240 is equipped with $G_x = 5$ cutter groups, the five cutter groups are seated at the positions 2.1, 2.4, 2.7, 2.10, and 2.13. If the face cutter head 240 is equipped with $G_x = 3$ cutter groups, the three cutter groups are seated at the positions 2.1, 2.6, and 2.11. The angular positions of the inner and outer cutters of the respective cutter groups are equidistant, since a fixed coupling is predefined between the face cutter head 240 and the bevel gear 11 to be machined when manufacturing the tooth gaps 12. It can only be ensured that tooth gaps 12 are produced at equal intervals in the case of consistently predefined speeds if the individual inner cutters or outer cutters are situated at uniform angular intervals along the nominal circles 241, 242.

FIG. 8B shows a side view and FIG. 8C shows a perspective view of the face cutter head 240 of FIG. 8A. Two fastening holes are provided per bar cutter. Two fastening holes 31.1, 31.2 are used to fasten an inner cutter, while two other fastening holes 31.3, 31.4 are used to fasten an outer cutter.

The following table, Table 2, shows a summary of how the all-purpose face cutter head 240 according to FIGS. 8A-8C can be equipped in various configurations on the outer nominal circle 242.

TABLE 2

Summary of all-purpose face cutter head configurations on the outer nominal circle where maximum number of passes of a face cutter head is $G_{max} = 15$

| Maximum outer number of passes $G_{2max} = 15$ | $G_G$ (divisor) | Number of passes in the respective configuration | Plane gear tooth count $z_p$ for hypocycloidal, ideally linear longitudinal flank line (RR = RG/2) | Typical plane gear tooth count for hypocycloidal, nonlinear longitudinal flank line RG/RR ≠ 2 and c ≠ RR |
|---|---|---|---|---|
| first bevel gear | 1 | 15 | Approx. 30 | 28.5 < z < 31.5 |
| second bevel gear | 3 | 5 | Approx. 10 | 9.5 < z < 10.5 |
| third bevel gear | 5 | 3 | Approx. 6 | 5.7 < z < 6.3 |

The following table, Table 3, shows a summary of how the all-purpose face cutter head 240 according to FIGS. 8A-8C can be equipped on the inner nominal circle 241. Since the number of passes $G_{1max} = 13$ is, a prime number, there is only one possible configuration here.

TABLE 3

Summary of all-purpose face cutter head configurations on the inner nominal circle where maximum number of passes of a face cutter head is $G_{max} = 13$

| Maximum inner number of passes $G_{1max} = 13$ | $G_G$ (divisor) | Number of passes in the respective configuration | Plane gear tooth count $z_p$ for hypocycloidal, ideally linear longitudinal flank line (RR = RG/2) | Typical plane gear tooth count for hypocycloidal, nonlinear longitudinal flank line RG/RR ≠ 2 and c ≠ RR |
|---|---|---|---|---|
| first bevel gear | 1 | 13 | Approx. 26 | 24.7 < z < 27.3 |

Another embodiment is shown in FIGS. 9A-9C. FIG. 9A shows a schematic top view of a second face cutter head 240, which is designed for the purpose of being able to produce various bevel gears 11 having hypocycloidal teeth depending on the equipment/configuration. The face cutter head 240 shown has a number $G_{1max}$ of receptacle openings 25.1, 25.2, which are situated along the first nominal circle 241 having cutter head nominal circle radius $r_{c1}$. The reference numeral 25.1 identifies the receptacle openings for outer cutters and the reference numeral 25.2 identifies the receptacle openings for inner cutters of the nominal circle 241.

According to an embodiment, the face cutter head 240 can be equipped along the first nominal circle 241 either with $G_{1max} = 20$ cutter groups or with a smaller number (i.e., $G_x < G_{1max}$) of bar cutters. The number $G_{1max} = 20$ can be divided by the whole numbers $G_G = 10$, $G_G = 5$, $G_G = 4$, and $G_G = 2$. Therefore, in another configuration, the face cutter head 240 can be equipped along the nominal circle 241, for example, with $G_x = 10$, $G_x = 5$, $G_x = 4$, or $G_x = 2$, cutter groups. For example, if the face cutter head 240 is equipped with $G_x = 10$ cutter groups, these ten cutter groups are seated at the positions 1.1, 1.3, 1.5, 1.7, 1.9, 1.11, 1.13, 1.15, 1.17, and 1.19. For example, if the face cutter head 240 is equipped with $G_x = 4$ cutter groups, these four cutter groups are seated at the positions 1.1, 1.6, 1.11, and 1.16. The angular positions of the inner and outer cutters of the respective cutter groups are equidistant, since a fixed coupling is predefined when manufacturing the tooth gaps between the face cutter head 240 and the bevel gear 11 to be machined. It can only be ensured that tooth gaps 12 are produced at uniform intervals at constant predefined speeds if the individual bar cutters are situated at uniform angular intervals along the nominal circles.

The following table, Table 4, shows a summary of how the all-purpose face cutter head 240 according to FIGS. 9A-9C can be equipped on the nominal circle 241 in various configurations.

TABLE 4

Summary of all-purpose face cutter head configurations on the nominal circle where maximum number of passes of a face cutter head is $G_{max} = 20$

| Maximum number of passes $G_{1max} = 20$ | $G_G$ (divisor) | Number of passes in the respective configuration | Plane gear tooth count $z_p$ for hypocycloidal, ideally linear longitudinal flank line (RR = RG/2) | Typical plane gear tooth count for hypocycloidal, nonlinear longitudinal flank line RG/RR ≠ 2 and c ≠ RR |
|---|---|---|---|---|
| first bevel gear | 1 | 20 | Approx. 40 | 38 < z < 42 |

TABLE 4-continued

Summary of all-purpose face cutter head configurations on the nominal circle where maximum number of passes of a face cutter head is $G_{max} = 20$

| Maximum number of passes $G_{1max} = 20$ | $G_G$ (divisor) | Number of passes in the respective configuration | Plane gear tooth count $z_p$ for hypocycloidal, ideally linear longitudinal flank line (RR = RG/2) | Typical plane gear tooth count for hypocycloidal, nonlinear longitudinal flank line RG/RR ≠ 2 and c ≠ RR |
|---|---|---|---|---|
| second bevel gear | 2 | 10 | Approx. 20 | 19 < z < 21 |
| third bevel gear | 4 | 5 | Approx. 10 | 9.5 < z < 10.5 |
| fourth bevel gear | 5 | 4 | Approx. 8 | 7.6 < z < 8.4 |
| fifth bevel gear | 10 | 2 | Approx. 4 | 3.8 < z < 4.2 |

As is typical, the face cutter heads 240 have an essentially cylindrically symmetrical basic shape having a plate-shaped head area 30 and a cylindrical rear area 32. A central hole 33 is provided in the middle, in order to be able to fasten the face cutter head 240 on a tool spindle (e.g., on a spindle drive 101 shown in FIG. 7).

The receptacle openings 25.1, 25.2, 26.1, 26.2 may be implemented so that they extend linearly or diagonally through the face cutter heads 240. The receptacle openings are therefore visible on both the front side of the head area 30 and also on the rear side 34.

In the face cutter heads 240, precisely manufactured slots may be used as receptacle openings 25.1, 25.2, 26.1, 26.2 for the exact radial and angular fixing of the positions of the bar cutters. The receptacle openings 25.1, 25.2, 26.1, 26.2 form so-called cutter chambers for the exact radial and angular fixing of the positions and for the fastening of the bar cutters, e.g., using clamping screws.

Spacer plates may be laid in the cutter chambers, in order to be able to displace the bar cutters radially in the respective receptacle openings 25.1, 25.2, 26.1, 26.2 in small steps (corresponding to the thickness of the spacer plates). The approach of using spacer plates, which are also referred to as parallel plates, is well known in the art and has been previously used in older cutter heads.

Clamping wedges can also be used for positioning and fastening the bar cutters, which may be inserted into the receptacle openings 25.1, 25.2, 26.1, 26.2 diagonally to the axial direction of the cutter head 20.

The bar cutters typically have a cutter shaft having a rectangular or prismatic cross-section. The receptacle openings 25.1, 25.2, 26.1, 26.2 of the face cutter heads 240 therefore have a corresponding cross-section, which may be complementary. The cutter shafts can also have a concave or convex surface, however. In this case, the shape of the receptacle openings 25.1, 25.2, 26.1, 26.2 may be adapted accordingly.

As should be recognized by those of ordinary skill in the pertinent art based on the teachings herein, numerous changes and modifications may be made to the above-described and other embodiments of the present invention without departing from its scope as defined in the appended claims. Accordingly, this detailed description of embodiments is to be taken in an illustrative, as opposed to a limiting, sense.

What is claimed is:

1. A method of producing a plurality of bevel gears having longitudinal flank lines defined by a hypocycloid, comprising:

producing a first bevel gear in a continuous indexing method using an all-purpose face cutter head configured in a first configuration with a first number of cutter groups corresponding to a first number of passes of the all-purpose face cutter head used to produce the first bevel gear; and producing a second bevel gear in the continuous indexing method using the all-purpose face cutter head configured in a second configuration with a second number of cutter groups different from the first number of cutter groups and corresponding to a second number of passes of the all-purpose face cutter head, different from the first number of passes, used to produce the second bevel gear.

2. A method according to claim 1, wherein:

the all-purpose face cutter head includes at least one first fixed cutter head nominal radius and at least one second fixed cutter head nominal radius;

the first number of passes defines a maximum number of cutter groups that can be situated on the at least one first fixed cutter head nominal radius; and the second number of passes defines a number of cutter groups that can be situated on the at least one second fixed cutter head nominal radius.

3. A method according to claim 2, further comprising configuring a fixed transmission ratio between the all-purpose face cutter head and each bevel gear to thereby produce a hypocycloidal longitudinal flank line on each of the bevel gears.

4. A method according to claim 3, wherein the longitudinal flank line is one of linear and quasi-linear.

5. A method according to claim 1, wherein the all-purpose face cutter head has only one fixed cutter head nominal radius.

6. A method according to claim 5, wherein:

the first number of passes corresponds to a maximum number of passes, the maximum number of passes being divisible at least once by a whole number greater than or equal to two; and when the all-purpose face cutter head is equipped in the first configuration, the all-purpose face cutter head is configured with a maximum number of cutter groups corresponding to the maximum number of passes;

when the all-purpose face cutter head is configured in the second configuration, the all-purpose face cutter head is equipped with a second number of cutter groups corresponding to a second number of passes equal to the maximum number of passes divided by the whole number.

7. A method according to claim 6, further comprising configuring a fixed transmission ratio between the all-purpose face cutter head and each bevel gear to thereby produce a hypocycloidal longitudinal flank line on each of the bevel gears.

8. A method according to claim 7, wherein the longitudinal flank line is one of linear and quasi-linear.

9. A method according to claim 1, further comprising configuring a fixed transmission ratio between the all-purpose face cutter head and each bevel gear to thereby produce a hypocycloidal longitudinal flank line on each of the bevel gears.

10. A method according to claim 9, wherein the longitudinal flank line is one of linear and quasi-linear.

11. A method of producing at least two bevel gears having hypocycloidal longitudinal flank lines, comprising producing the at least two bevel gears with a face cutter head in a continuous indexing milling method, the face cutter head comprising first receptacle openings for receiving a maximum number of bar cutters situated along a first cutter head nominal circle defining a first cutter head nominal radius, wherein the number of first receptacle openings is divisible at least once by a whole number greater than or equal to two; and
wherein the face cutter head is configured into
a first configuration having a maximum number of cutter groups corresponding to the maximum number of bar cutters, with the maximum number of cutter groups corresponding to a first number of passes of the face cutter head used to produce one of the bevel gears; and
a second configuration having a second number of cutter groups corresponding to a second number of passes of the face cutter head used to produce another of the bevel gears, the second number of passes being equal to the maximum number of bar cutters divided by the whole number.

12. The method according to claim 11, wherein the face cutter head includes second receptacle openings for receiving a second maximum number of bar cutters situated along a second cutter head nominal circle defining a second cutter head nominal radius larger than the first cutter head nominal radius.

* * * * *

UNITED STATES PATENT AND TRADEMARK OFFICE
CERTIFICATE OF CORRECTION

PATENT NO. : 8,388,281 B2
APPLICATION NO. : 13/097848
DATED : March 5, 2013
INVENTOR(S) : Hünecke et al.

Page 1 of 1

It is certified that error appears in the above-identified patent and that said Letters Patent is hereby corrected as shown below:

Title Page, Item (54) and in the Specification, Column 1, lines 1-4 Title "Method for Producing Bevel Gears Having Hypocycloidai Teeth in the Continuous Indexing Method Using a Corresponding Face Cutter Head" should be changed to --Method for Producing Bevel Gears Having Hypocycloidal Teeth in the Continuous Indexing Method Using a Corresponding Face Cutter Head--

Signed and Sealed this
Twenty-second Day of October, 2013

Teresa Stanek Rea
*Deputy Director of the United States Patent and Trademark Office*